United States Patent Office 3,026,616
Patented Mar. 27, 1962

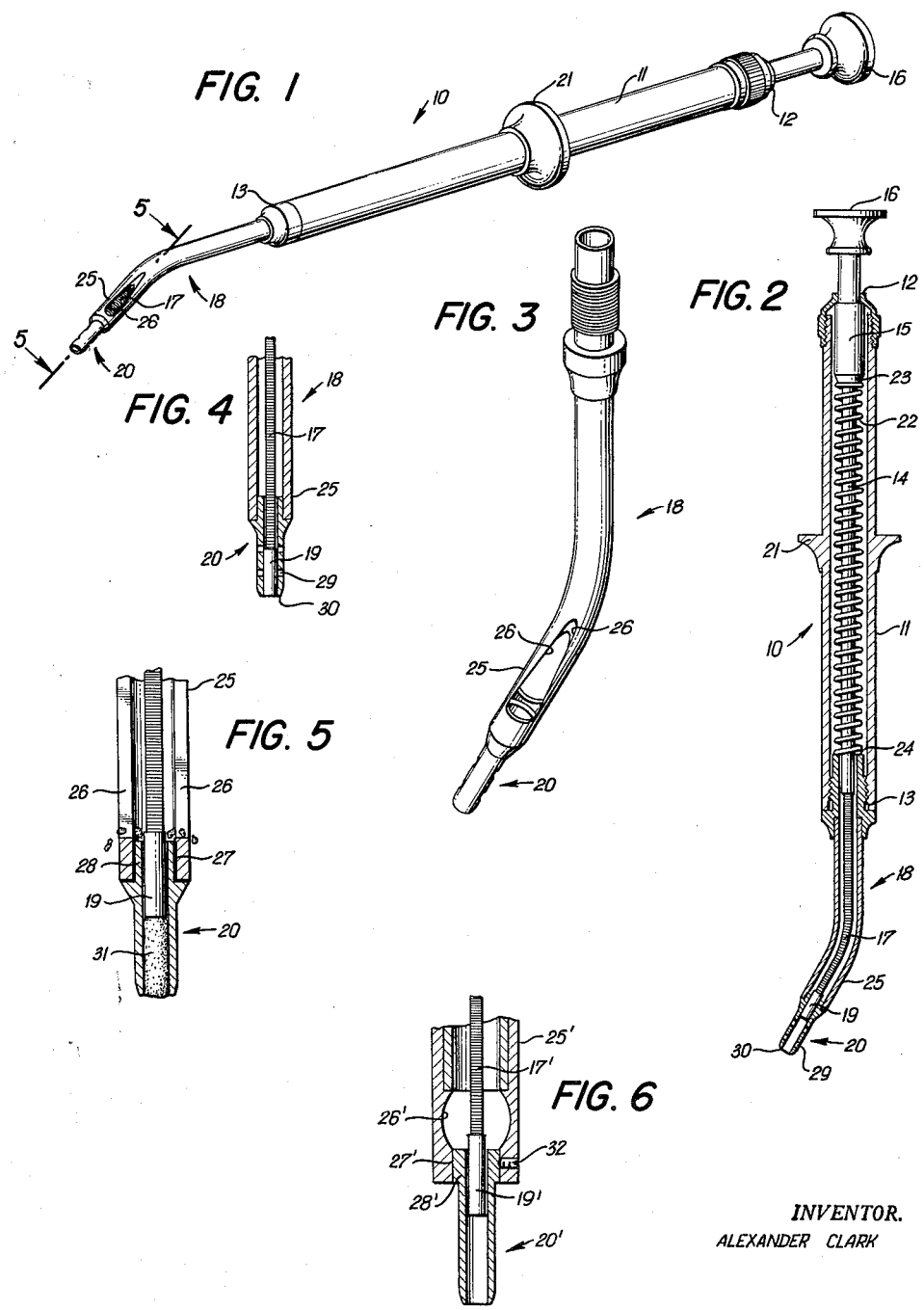

3,026,616
CLOGLESS TIP FOR A DENTAL AMALGAM
CARRIER APPARATUS
Alexander Clark, Hendersonville, N.C., assignor of one-tenth to Gadget-Of-The-Month Club, Inc., North Hollywood, Calif., a corporation of California
Filed Nov. 12, 1959, Ser. No. 852,534
4 Claims. (Cl. 32—60)

The present invention consists of a clogless or clog-free tip for a dental amalgam carrier apparatus and such a clogless or clog-free tip in combination with such a dental amalgam carrier apparatus. The important feature of the present invention is the structure thereof which makes the tip virtually completely clogless or clog-free, which is not true of prior art dental amalgam carriers and tips therefor, which frequently become clogged because a small amount of the dental amalgam may partly or wholly by-pass the plunger of the apparatus and subsequently harden to a degree such as to very substantially clog the apparatus and virtually render it inoperative until the hardened dental amalgam has been removed, which generally requires heating the apparatus in a flame until the amalgam becomes softened to a degree such as to allow it to be removed. This is a time-consuming and tedious operation and frequently becomes necessary at a time when a dentist needs to use the dental amalgam carrier, for filling a cavity in a patient's tooth, at which time, obviously the dentist does not wish to be forced to take time to clean the dental amalgam carrier.

It is important to note that the improved clogless or clog-free tip for a dental amalgam carrier (either individually or in combination with a dental amalgam carrier) comprising the present invention, completely avoids the above-mentioned prior art problem in that it embodies a novel structure which effectively renders the tip clogless or clog-free by reason of being provided with waste amalgam by-pass aperture means behind the plunger means whereby any small amount of amalgam which may by-pass the plunger means may be exhausted or cleaned out through said waste amalgam by-pass aperture means and thereby will not be retained within the apparatus long enough for the amalgam to harden and clog the dental amalgam carrier apparatus and tip in the undesirable prior art manner mentioned above.

It is an object of the present invention to provide a clogless or clog-free tip for a dental amalgam carrier either individually or in combination with a dental amalgam carrier apparatus of the type including a longitudinal hollow casing and a digitally-operable or thumb-operable plunger slidably carried thereby, said clogless or clog-free tip including a hollow longitudinal casing extension member carried by (preferably though not necessarily removably carried by) the forward or egress end of the casing of the dental amalgam carrier apparatus and slidably carrying therein a flexible forward end of a connecting rod of the dental amalgam carrier apparatus, which carries at its forward end the plunger of the dental amalgam carrier apparatus in a position extending beyond an outer or forward end of the casing extension member, and said casing extension member being further provided at its forward end with a hollow substantially cylindrical amalgam receiving, retaining, carrying, and dispensing barrel which slidably carries the plunger therein for controllable reciprocation between a forward amalgam-dispensing position and a rear amalgam receiving, retaining, and carrying position, with said casing extension and/or said amalgam-receiving barrel having a waste amalgam by-pass aperture means extending from the interior thereof to the exterior thereof and positioned behind the plunger whereby to allow any excess amalgam which may accidentally by-pass the plunger to be exhausted and/or removed through said waste amalgam by-pass aperture means in order to prevent said waste amalgam from hardening inside of the apparatus, which would normally tend to clog the amalgam carrier.

It is a further object of the present invention to provide apparatus of the character set forth in the preceding object, wherein the amalgam receiving, retaining, and carrying barrel is provided with a sharpened forward cutting edge of lesser interior diameter than the interior diameter of the remainder of said barrel and is further provided with a plurality of small apertures of a size such as to effectively allow passage of liquid from the amalgam therethrough but to prevent passage of the entire amalgam itself therethrough. In other words, they may be employed for "wringing out" or "drying out" or removing some of the liquid from the amalgam.

It is a further object of the present invention to provide apparatus of the character defined above, wherein the amalgam receiving, retaining, and carrying barrel is interchangeable with any of a plurality of other amalgam receiving, retaining, and carrying barrels of different size and wherein the plunger and connecting rod may be correspondingly changed.

It is a further object to provide apparatus of the character set forth in any of the preceding objects, which is of extremely simple, cheap, foolproof construction such as to facilitate widespread use thereof.

Further objects will be apparent to persons skilled in the art after a careful study hereof.

For the purpose of clarifying the nature of the present invention, several exemplary embodiments are illustrated in the hereinbelow-described figures of the accompanying drawings, and are described in detail hereinafter.

FIG. 1 is a perspective view of a dental amalgam carrier in combination with the improved clogless or clog-free tip of the present invention.

FIG. 2 is a longitudinal sectional view through the apparatus of FIG. 1 with the thumb-operable button and the connecting rod having a flexible forward portion carrying a plunger, being shown in elevation and with the remainder of the apparatus being shown in vertical section. This view shows the connecting rod and the plunger maintained in the normal retracted position by the biasing springs means.

FIG. 3 is a larger scale perspective view of just the dispensing tip of the present invention.

FIG. 4 is a fragmentary vertical sectional view through just the dispensing tip end of the apparatus of FIG. 1 showing the plunger in the forward position which it assumes when the thumb-operable button at the right of FIG. 1 is moved toward the finger-engageable member carried at the center of the casing shown in FIG. 1.

FIG. 5 is a fragmentary enlarged cross-sectional view through the forward end of the apparatus shown in FIG. 1 and taken in a plane perpendicular to the plane of the vertical section comprising FIG. 4. Furthermore, this view shows the plunger in retracted position and shows the amalgam receiving barrel retaining and carrying a quantity of dental amalgam and also shows a small amount of waste amalgam which has accidentally by-passed the plunger in a position such that it can be exhausted or cleaned out through the waste amalgam by-pass aperture means.

FIG. 6 is a view similar to FIG. 4, but shows a slightly modified tip having a different interchangeable amalgam receiving barrel removably carried by the tip structure and shows, fragmentarily, a different interchangeable plunger in cooperative relationship therewith.

In the specific example illustrated in FIGS. 1–5, the hereinbefore-mentioned dental amalgam carrier apparatus is indicated generally at 10 and includes a longitudinal cylindrical hollow casing 11 having an apertured first rear actuator end 12 and an apertured second forward egress end 13, and carries a longitudinal connecting rod 14 having an enlarged rear portion 15 threadedly attached thereto and provided with a thumb-engageable or thumb-operable button 16 at the rear end thereof, and provided with a flexible forward end 17 which, in the example illustrated takes the form of a coiled spring, and which extends forwardly through the hollow interior of a hollow longitudinal casing extension member, indicated generally at 18, threadedly engaged with the forward end of the casing 13, and with the forward end of the flexible portion 17 of the connecting rod being provided with an amalgam-abuttable plunger means 19, which is slidably carried within an amalgam receiving, retaining, and carrying barrel indicated generally at 20.

It should also be noted that the dental amalgam carrier apparatus, indicated generally at 10, has a finger-engageable member comprising the fixed encircling member 21 carried at about the middle of the exterior of the casing 11 whereby the connecting rod 14 and the plunger 19 may be controllably reciprocated by placing the index and second finger on opposite sides of the casing 11 against the forward surface of the finger-engageable member 21 while a thumb may be forced against the thumb-abuttable button 16 whereby to force the entire connecting rod 14 forward in a manner such as to forcibly compress the coiled biasing spring 22 lying between the shoulder 23 and the shoulder 24 inside of the main casing 11. This will cause the plunger 19 to move to the forward position shown in FIG. 4 for the purpose of expelling dental amalgam into a tooth cavity or the like.

The tip for a dental amalgam carrier apparatus generally referred to hereinbefore comprises the hollow longitudinal casing extension member mentioned above and indicated generally at 18 in FIGS. 1–5 and the forward portion 25 thereof provided with oppositely directed transverse waste amalgam by-pass aperture means 26 and provided with a forwardly directed receiving aperture 27 which mounts and receives the rear hub portion 28 of the amalgam receiving barrel indicated generally at 20. In the example illustrated in FIGS. 1–5, this connection comprises a silver soldered, brazed, or welded connection, although not specifically so limited. A portion of the forward flexible part 17 of the connecting rod can be seen through the transverse waste amalgam by-pass aperture means 26.

In the specific example illustrated in FIGS. 1–5, the amalgam receiving barrel 20 has a plurality of small apertures 29 each of a size such as to effectively allow passage therethrough of liquid from the amalgam but to prevent passage of the entire body of amalgam itself therethrough, whereby it is possible to partially "wring out" or "dry out" the amalgam. Also in the specific example illustrated in FIGS. 1–5 the amalgam receiving barrel 20 is provided with a sharpened forward cutting edge 30. This cutting edge may be pushed downwardly onto a quantity of dental amalgam to effectively cause a core of dental amalgam to be received within the barrel 20 in the manner best shown at 31 in FIG. 5, after which the entire carrier may be moved so as to place the forward end 30 contiguous to a cavity in a patient's tooth, and the thumb button 16 may be forced toward the finger grip 21 so as to cause the plunger 19 to force a desired amount of the dental amalgam 31 out of the forward end 30 of the barrel 20 into the tooth cavity. It should be noted that the waste amalgam by-pass aperture means 26 allows any plunger-by-passed amalgam to be easily cleaned out so that it will never harden to clog the device.

FIG. 6 illustrates the interchangeable feature of a slightly modified form of the improved dental amalgam tip of the present invention wherein a barrel 20' of a size different from the barrel 20, is shown removably interchangeably mounted with respect to the receiving aperture 27' by means of a hub portion 28' identical in size to the hub portion 28, said hub portion being removably fastened by set screw 32 carried in the enlarged forward portion 25'. In this modification, it should be noted that the connecting rod has also been interchanged so that a different-sized plunger 19' is carried within the different-sized barrel 20'.

This merely illustrates the interchangeable aspect of the invention, it being understood that virtually any desired type or size of amalgam receiving, retaining, and carrying barrel and corresponding plunger may be interchanged. It should also be understood that if such interchangeability is not desired the barrel may be fixedly attached with respect to the remainder of the apparatus. It should also be noted that in certain forms of the invention, the apertures 29 may be eliminated, if desired.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. A clogless tip for a dental amalgam carrier apparatus of the type including a longitudinal hollow casing, a connecting rod, and a digitally operable plunger slidably carried thereby, comprising: a hollow longitudinal casing extension member adapted to be carried by an egress end of a dental amalgam carrier apparatus casing and to slidably carry therein a forward portion of a dental amalgam carrier apparatus connecting rod having a plunger adapted to extend beyond an outer forward end of said casing extension member, and being provided with a hollow substantially cylindrical amalgam receiving barrel adapted to slidably carry the plunger therein for controllable reciprocation between a forward amalgam dispensing position and a rear amalgam receiving and retaining position, said casing extension member having an interior diameter larger than the plunger and larger than the forward portion of the connecting rod adapted to slidably pass therethrough and being provided with transverse waste amalgam by-pass aperture means to prevent amalgam which may by-pass the plunger from being retained and hardening whereby to clog the amalgam carrier apparatus tip; said amalgam receiving barrel being provided with a plurality of apertures of a size such as to effectively allow passage of liquid from the amalgam but prevent passage of the amalgam therethrough.

2. The combination of: dental amalgam carrier apparatus including a longitudinal hollow casing, a connecting rod, and a digitally operable plunger slidably carried thereby; and a clogless tip for the dental amalgam carrier apparatus comprising a hollow longitudinal casing extension member carried by an egress end of said casing and slidably carrying therein a forward portion of said connection rod with said plunger extending beyond an outer forward end of said casing extension member and being provided with a hollow substantially cylindrical amalgam receiving barrel slidably carrying said plunger therein for controllable reciprocation between a forward amalgam dispensing position and a rear amalgam receiving and retaining position, said casing extension member having an interior diameter larger than the plunger and larger than the forward portion of the connecting rod slidably passing therethrough and being provided with transverse waste amalgam by-pass aperture means to prevent amalgam which may by-pass the plunger from being retained and hardening whereby to clog the amalgam carrier apparatus tip; said amalgam receiving barrel being provided with a sharpened forward cutting edge and a plurality of apertures of a size such as to effectively allow passage of liquid from the amalgam but prevent passage of the amalgam therethrough.

3. The combination of: dental amalgam carrier apparatus including a longitudinal hollow casing, a connecting rod, and a digitally operable plunger slidably carried thereby; and a clogless tip for the dental amalgam carrier apparatus comprising a hollow longitudinal casing extension member carried by an egress end of said casing and slidably carrying therein a forward portion of said connecting rod with said plunger extending beyond an outer forward end of said casing extension member and being provided with a hollow substantially cylindrical amalgam receiving barrel slidably carrying said plunger therein for controllable reciprocation between a forward amalgam dispensing position and a rear almalgam receiving and retaining position, said casing extension member having an interior diameter larger than the plunger and larger than the forward portion of the connecting rod slidably passing therethrough and being provided with transverse waste amalgam by-pass aperture means to prevent amalgam which may by-pass the plunger from being retained and hardening whereby to clog the amalgam carrier apparatus tip; said amalgam receiving barrel being provided with a plurality of apertures of a size such as effectively allow passage of liquid from the amalgam but prevent passage of the amalgam therethrough.

4. The combination of: a dental amalgam carrier apparatus including a longitudinal hollow casing having an apertured actuator end and an apertured egress end opposit said actuator end and a connecting rod slidably mounted within said hollow casing and having a rear portion extending rearwardly through the apertured actuator end to a position exterior thereof and being provided with an exterior plunger-actuating thumb-operable button member, said connecting rod having a flexible forward portion extending forwardly through said egress aperture to to a position forwardly displaced therefrom and being provided with an amalgam-abuttable plunger, with said casing being provided with a finger-engageable exterior member and including spring means effectively biasing said connecting rod away from said apertured egress end of said casing and biasing said plunger toward said apertured egress end of said casing; and a clogless tip for the dental amalgam carrier apparatus comprising a hollow longitudinal casing extension member removably carried by the egress end of said casing and slidably carrying therein the flexible forward end of said connecting rod with said plunger extending beyond an outer forward end of said casing extension member and being removably provided with a hollow substantially cylindrical amalgam receiving barrel slidably carrying said plunger therein for controllable reciprocation between a forward amalgam dispensing position and a rear amalgam receiving and retaining position, said casing extension member having an interior diameter larger than the plunger and larger than the flexible forward portion of the connecting rod slidably passing therethrough and being provided with transverse waste amalgam by-pass aperture means to prevent amalgam which may by-pass the plunger from being retained and hardening whereby to clog the amalgam carrier apparatus tip; said amalgam receiving barrel being provided with a plurality of apertures of a size such as to effectively allow passage of liquid from the amalgam but prevent passage of the amalgam therethrough.

References Cited in the file of this patent

UNITED STATES PATENTS

| | | |
|---|---|---|
| 742,446 | Kelly | Oct. 27, 1903 |
| 2,767,470 | Leach | Oct. 23, 1956 |